April 14, 1925.  
E. C. KENT  
ROTARY KILN  
Filed July 24, 1923  
1,533,866  
2 Sheets-Sheet 1
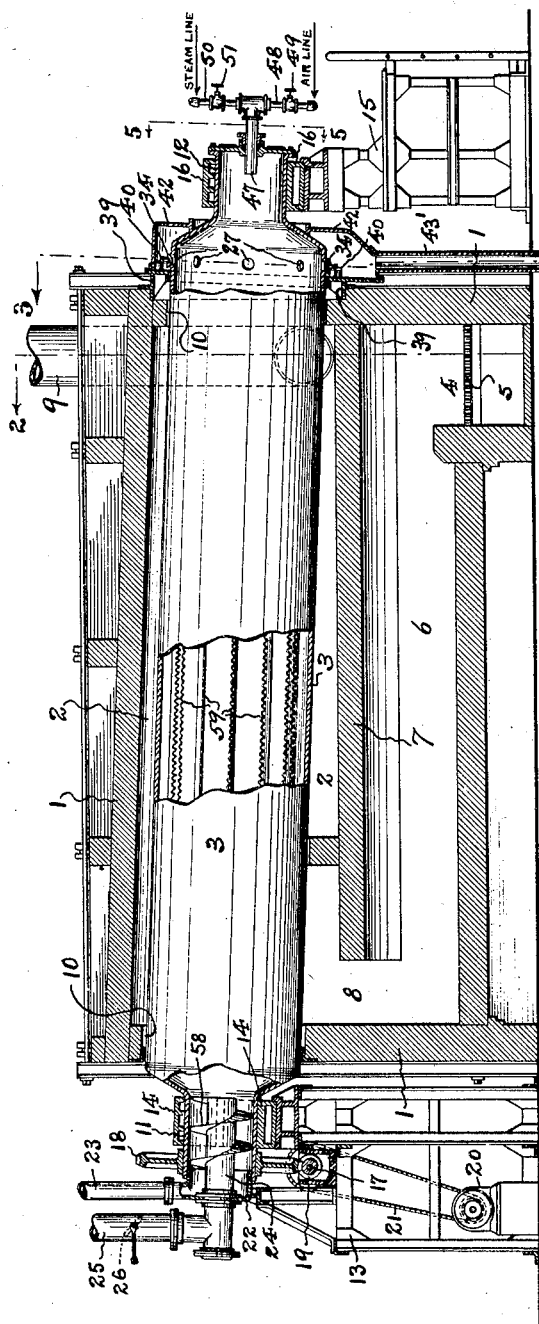
INVENTOR.
Ellis C. Kent,
BY
Frantzef and Richards
ATTORNEYS.

April 14, 1925.
E. C. KENT
ROTARY KILN
Filed July 24, 1923
1,533,866
2 Sheets-Sheet 2
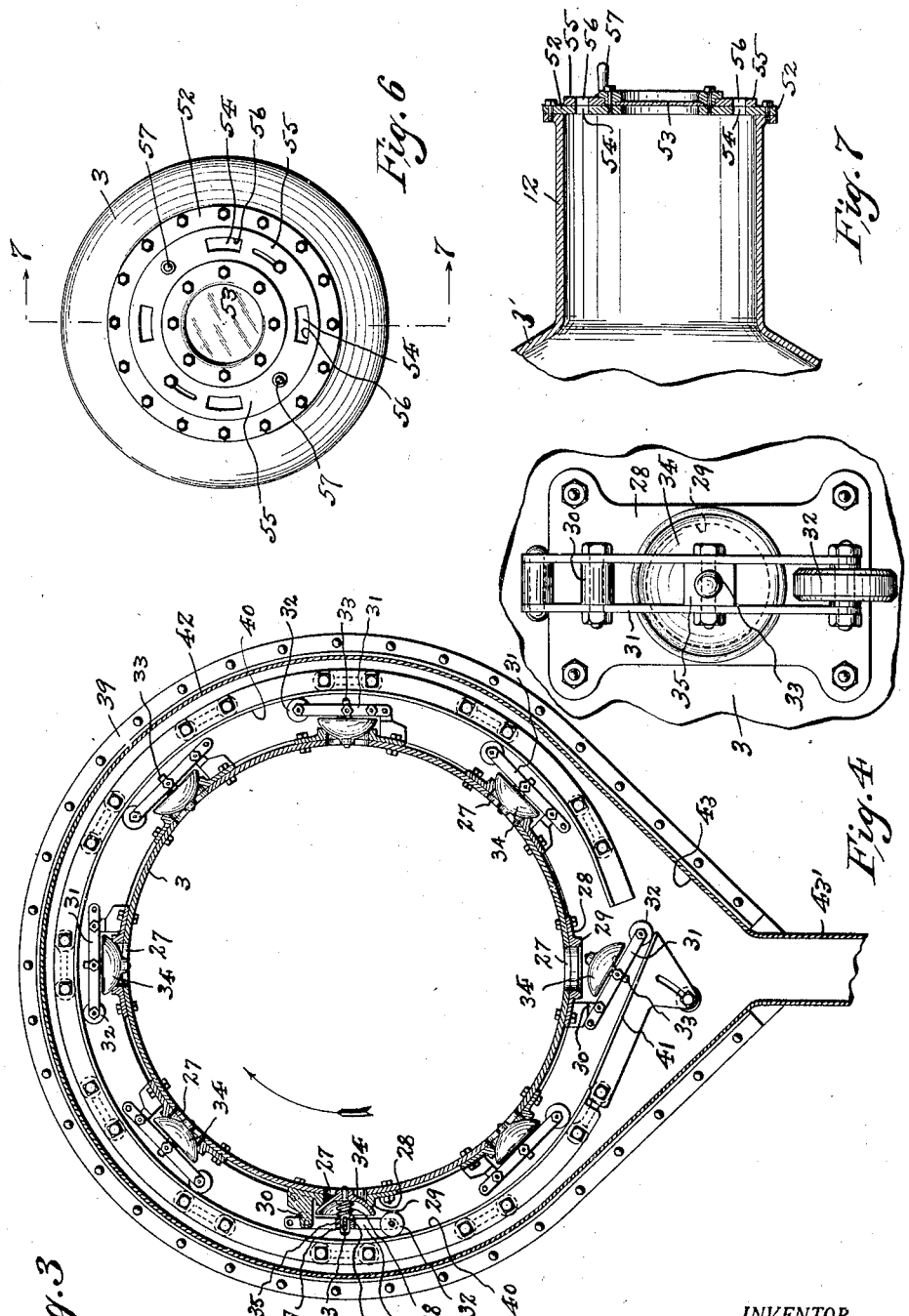
INVENTOR.
Ellis C. Kent,
BY
Frantzel and Richards
ATTORNEYS.

Patented Apr. 14, 1925.

1,533,866

UNITED STATES PATENT OFFICE.

ELLIS C. KENT, OF BROOKLYN, NEW YORK, ASSIGNOR TO ROBERT SAYRE KENT, INC., A CORPORATION OF NEW YORK.

ROTARY KILN.

Application filed July 24, 1923. Serial No. 653,435.

*To all whom it may concern:*

Be it known that I, ELLIS C. KENT, a citizen of the United States, residing at Brooklyn, in the county of Kings and State of New York, have invented certain new and useful Improvements in Rotary Kilns; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

This invention relates, generally, to improvements in rotary kilns; and the invention has reference, more particularly, to a novel construction of rotary kiln for carrying on the processes of either revivifying or decarbonizing filtrate materials, such as char or bone-black, Fuller's earth or other material.

As is well understood by those skilled in the art, a filtrate material such as char, which has been used in filtration processes, may be revivified by baking the same in a retort or drum heated to a cherry red heat, whereby the impurities collected in the pores of the char are burnt or distilled off, so that the filtering value of the char is brought back to its initial efficiency. It is also recognized that it is desirable for a char filtrate to contain approximately eight per cent of carbon. I have found, however, that in carrying on the baking process in ordinary rotary retorts or drums, into the interior of which air may gain more or less uncontrolled access, there is a tendency toward an excess of air within the retort or drum which so increases combustion as to entail a too great consumption of the carbon content of the char, with the consequence that said carbon content is diminished below the desired eight per cent limit, thus lessening the filtering value of the revivified material. On the other hand, if the construction of the retort or drum is such that not enough air gains access to the interior thereof, then the lack of air makes for a gain in the carbon content of the char, so that the carbon builds up in the pores of the char thereby destroying its filtering value.

It is the object of this invention to provide a novel construction of rotary kiln, which is substantially air tight, and in connection with which means are provided for controlling the introduction of air, or when desirable an inert gas, thereinto, to the end that most favorable conditions may be established within the retort or drum best adapted to efficiently revivify the filtrate material, so that it is not only quickly purged of undesired impurities, but so that the carbon content thereof may be easily controlled and maintained at the desired limit. It is also the object of this invention to provide a rotary retort kiln of the character above mentioned, in which filtrate material, such as Fuller's earth, may be decarbonized by the aid of controlled application of heat and air, and of inert gas, if desired, so that not only are the impurities and carbon removed therefrom, but the formation of hard gas carbon in the pores of such material is prevented.

Other objects of this invention, not at this time more particularly enumerated, will be clearly understood from the following detailed description of the same.

The invention is clearly illustrated in the accompanying drawings, in which:—

Figure 1 is a vertical longitudinal section of the novel rotary kiln made according to and embodying the principles of this invention; Figure 2 is a tranverse section through the kiln, taken on line 2—2 in said Figure 1; Figure 3 is a detail transverse section through the discharge end of the rotary retort or drum of the kiln and its exterior housing, said section being taken on line 3—3 in said Figure 1, and said view being drawn on an enlarged scale; Figure 4 is an enlarged fragmentary plan view of one of the discharge port closures of the rotary retort or drum; Figure 5 is an enlarged detail fragmentary end face view of the rotary retort or drum, taken on line 5—5 in Figure 1; Figure 6 is a view similar to that shown in Figure 5, but illustrating a modified arrangement of air admission means for the rotary retort or drum; and Figure 7 is a fragmentary longitudinal section, taken on line 7—7 in said Figure 6.

Similar characters of reference are employed in all of the hereinabove described views, to indicate corresponding parts.

Referring now to said drawings, the reference character 1 indicates a suitable housing, usually built of brick. The upper portion of the interior of the housing provides a retort or drum chamber 2, through which longitudinally extends the rotary retort or drum 3 of the kiln. The lower portion of the interior of the housing 1 provides a fire-box 4 having the usual fuel supporting grate 5, and extending forwardly from said fire-box 4, and beneath said retort or drum chamber 2, is a combustion chamber 6. Said combustion chamber 6 and fire-box 4 are separated from said retort or drum chamber 2 by means of a transverse arch partition 7, which is provided, at the end opposite said fire-box, and beneath the forward or receiving end of said rotary retort or drum 3, with a port 8 affording communication between said combustion chamber 6 and said retort or drum chamber 2. Communicating with the rear end of said retort or drum chamber 2 is a suitable flue or stack pipe 9.

Said rotary retort or drum 3 comprises a cylindrical hollow steel shell which extends longitudinally through said chamber 2, its respective ends projecting outwardly through openings 10 in the respective end walls of the housing 1. Said retort or drum inclines longitudinally downward from its receiving end toward its discharge end. The receiving end of said retort or drum terminates in an outwardly projecting hollow trunnion member 11 of reduced diameter, and in like manner the discharge end of said retort or drum also terminates in an outwardly projecting hollow trunnion member 12. Supported upon a suitable pedestal frame work 13 is a bearing member 14 in which the trunnion member 11 is journaled, and supported upon a similar pedestal frame work 15 is a bearing member 16 in which the trunnion member 12 is journaled. Fixed upon said trunnion member 11 is a gear wheel 18 which is driven by a worm gear 19 suitably mounted on a shaft 17 journaled in connection with said pedestal frame work 13. Suitable means are provided for driving said worm gear 19 and gear wheel 18, to thereby rotate the retort or drum 3 about its longitudinal axis. Illustrative of such means I have shown an electric motor 20 as the prime mover, which operates the worm gear shaft 17 through a chain and sprocket drive 21.

The open extremity of said trunnion member 11 revolves upon a stationary feed box 22, with which is connected a feed conduit 23 through which is delivered the material to be treated for deposit within the interior of the retort or drum 3. Supported in connection with the end wall of said feed box 22 is a centrally disposed vent pipe 24, the inner end of which extends centrally through the trunnion member so as to terminate at or within the receiving end of said retort or drum 3. Connected with the outer end of said vent pipe 24 is a suitable vent conduit 25 which is preferably connected in communication with a flue stack or chimney (not shown) to establish a draft or suction through said vent pipe and conduit. Said vent conduit 25 is provided with a suitable adjustable damper means 26 for regulating the draft effect through said vent pipe.

Provided in the wall of said retort or drum 3, at its rear or discharge end, are a plurality of discharge ports 27, suitably spaced apart in a circumferential line around the side discharge end of the retort or drum. Secured upon the outer surface of the retort or drum 3, so as to register with each discharge port 27 is a perforate plate 28 provided with annular boss 29 surrounding the margin of the discharge port and adapted to form a gate-seat. Projecting outwardly from one end of each plate 28 is a fulcrum arm 30 to which is pivoted a gate lever 31 provided at its free end with an anti-friction roller 32. Supported in connection with each gate lever 31 by means of its stem portion 33 is a gate member 34 which, when engaged upon the gate-seat 29 normally closes the discharge port 27 both against the out-flow of material and the entrance of air therethrough. In order to assure a close or tight fitting of the gate-member 34 against the gate-seat 29, the stem portion 33 is permitted to play through a guide-block 35 with which the gate lever 31 is provided, the movement being limited by a slot 36 provided in the stem through which passes a transverse pin 37 which is fixed in said guide-block 35. A coil compression spring 38 is supported around said stem 33, intermediate the gate-member 34 and guide-block 35, the tension of which firmly presses said gate-member in closed engagement with said gate-seat 29. Fixed in connection with the end of said housing, through which the discharge end of the retort or drum 3 projects, is a frame member 39 in connection with which is supported an annular trackway 40. Said track-way extends around the retort or drum 3 in outwardly spaced position therefrom so that when the latter rotates the anti-friction rollers 32 of the gate-levers 31 will ride on the track-way and will hold the said gate-levers inwardly swung and consequently the gate-members will be maintained in closed position relative to the discharge ports 27 with which they cooperate. Said track-way 40 is discontinuous at its lower or under side to provide an adjustable drop-section 41, so that as the retort or drum 3 rotates in the direction of the arrow in Figure 3, the rollers 32 of the gate-levers 31 will successively drop or swing outwardly away from the under side of the retort or drum, thus moving the gate-members 34 to open position as each discharge port 27 is carried to lowermost position by the rotation of the retort or drum 3. It is preferable that the spacing of the discharge ports 27 be such that only one is open at a time as it traverses the lowermost point of its path of rotation.

Suitably secured in connection with said frame-member 39 is an annular secondary housing or hood 42 which surrounds the exterior discharge end of said retort or drum 3, and which is substantially air tight. The underside of said hood 42 is shaped to provide a funnel-like member 43 which terminates in and communicates with a material discharge pipe or conduit 43' leading to suitable apparatus for receiving and cooling the treated material discharged from the retort or drum.

The end of said rear trunnion member 12 is closed by a cover plate 44, which is preferably provided with a series of glazed viewing openings 45 through which the operator may view the material undergoing treatment within the retort or drum 3. Connected with said cover plate 44, in alinement with the axis of rotation of said retort or drum 3, is a stuffing-box 46 through which extends a supply pipe 47 to communicate with the interior of said retort or drum 3. Suitably connected with said upper pipe 47 for selective operative communication therewith, is an air line pipe 48 having a suitable shut-off valve 49 and a steam line pipe 50 also having a suitable shut-off valve 51, so that by manipulation of the respective valves either air or an inert gas or fluid, such as steam may be introduced into the interior of the retort or drum 3 under the control and at the will of the operator.

Referring to Figures 6 and 7 of the drawings, I have shown a somewhat modified form of cover-plate for said rear trunnion member, which is constructed to permit the controlled admission of atmospheric air into the interior of said retort or drum 3. This modified form of cover-plate is indicated by the reference character 52, and the same is provided with a central glazed viewing opening 53. Provided in said cover-plate 52 are a plurality of air-admission openings or ports 54. Slidably arranged in connection with said cover plate 52 is an annular shutter or closure 55 for normally closing said openings or ports 54. Said shutter or closure 55 is provided with air openings or passages 56 which by a proper movement or adjustment of the shutter or closure, may be registered in alinement with the air admission openings or ports 54 to permit the entrance of air therethrough into the interior of the retort or drum 3. Said shutter or closure 55 is also provided with handgrip devices 57 by means of which the same may be adjusted to either open or close the air admission openings or ports 54 at the will of the operator.

In operating the device, constructed as above described, for the purpose of revivifying a filtrate material, such e. g. as char, the material to be treated is fed downwardly through the feed conduit 23 into the feed box 22, whence it enters through the hollow trunnion member 11 into the receiving end of the rotating retort or drum 3, such movement being aided by the helical fin 58 (see Figure 1). As the material moves gradually through the downwardly inclined rotating retort or drum 3 it is constantly agitated or sifted by the action of the longitudinal flights 59 which project from the inner sides of the retort or drum. The retort or drum is heated to the desired degree by the products of combustion, which originating in the fire-box 4 flow through the combustion chamber 6 and thence into the drum chamber 2 for circulation around the retort or drum until finally carried off through the stack 9. As will be understood from the above description, the interior of the retort or drum is substantially air tight, and consequently a controlled quantity of air adequate to modify the conditions in the interior of the drum, so that a desired effect upon the material is obtained, may be introduced into the retort or drum at the will of the operator by opening the air line 48 to pass a desired amount of air through the supply pipe 47. The vent pipe 24 will carry off the impurities distilled from the material treated. If it appears to the operator that too great a carbonization of the material is taking place, the air supply may be shut off, and if necessary an inert gas or steam may be admitted by opening communication between the steam line 50 and supply pipe 47. The steam or inert gas will counteract the effects of excess air, or the effects of the presence of residual air in the char. The operator by watching the material through the viewing openings 45 is able to judge the conditions existing at any given time, and thereupon modify the same to that desired, by manipulation of the air, or steam admission devices. By the time the material has traversed the length of the retort or drum 3 the desired treatment thereof is accomplished, and consequently the same is discharged by the automatic opening of the gate-members 34 so that the material may pass out through the discharge ports 27 as the latter traverse their lowermost positions in the course of the rotation of the retort or drum 3. The material thus discharged is conducted by the discharge pipe or conduit to suitable cooling apparatus.

Under some conditions an adequate control of air admission may be accomplished by the form of cover plate shown in Figures 6 and 7, in connection with which are provided the air admission ports and the manipulatable closures therefor. In such case the damper device 26 in the vent pipe 25 is so adjusted as to balance the draft or suction through the retort or drum, that a desired amount of air will be drawn into and through the interior of the latter when the air admission ports 54 are opened.

The novel construction of kiln above described is also admirably adapted to carry on decarbonizing treatments of filtrate material containing an excess of carbon, since air admission may be so controlled as to provide just the quantity of air necessary to support combustion of such excess of carbon, and thus reduce the material treated to the desired condition.

I am aware that some changes may be made in the construction of the kiln as above described and as illustrated in the accompanying drawings, without departing from the scope of and while still retaining the general principles of my present invention. Hence, I do not limit my invention to the exact arrangements and construction of parts, as described in the foregoing specification, nor do I confine myself to the exact details of the construction of the various parts as illustrated in the accompanying drawings.

I claim—

1. In a kiln, a substantially airtight rotary retort, means for heating said retort, means for introducing material to be treated into the forward receiving end of said retort, said retort having discharge means at its opposite end, means for automatically opening and closing said discharge means, a vent pipe communicating with the forward end of said retort, an adjustable damper mechanism connected with said vent pipe, and means at the rear end of said retort for controlling the admission of air thereinto.

2. In a kiln, a substantially airtight rotary retort, means for heating said retort, means for venting said retort, means for delivering material to be treated into one end of said retort, means for agitating the material passing through said retort, said retort having normally closed discharge means at its opposite end, automatic means for actuating said discharge means to temporarily open the same to the outflow of material therethrough, and means for controlling the admission of air or other gas into said retort.

3. In a kiln, a substantially airtight rotary retort, a furnace housing inclosing said retort for heating the same, means communicating with the forward end of said retort for introducing the material to be treated, said retort being provided adjacent to its rear end with an annular row of discharge ports, closure means for said discharge ports, means for automatically opening and closing said closure means, and means connected with the rear end of said retort for controlling the admission of air or other gas thereinto.

4. In a kiln, a substantially airtight rotary retort, a furnace housing inclosing the main body of said retort for heating the same, means communicating with the forward end of said rotort for introducing the material to be treated, means for venting said retort, an adjustable damper means connected with said venting means, means connected with the rear end of said retort for controlling the admission of air thereinto, said retort having material discharge ports adjacent to its rear end, and automatic means for successively opening and closing said discharge ports.

5. In a kiln, a substantially airtight rotary retort, a furnace housing inclosing the main body of said retort, for heating the same, means communicating with the forward end of said retort for introducing the material to be treated, means for venting said retort, an adjustable damper means connected with said venting means, means connected with the rear end of said retort for controlling the admission of air thereinto said retort having material discharge ports adjacent to its rear end, automatic means for successively opening and closing said discharge ports, an enveloping hood inclosing the discharge end of said retort, and a discharge conduit leading out of said hood.

6. In a kiln, a substantially air tight rotary retort, a furnace housing enclosing said retort for heating the same, means communicating with the forward end of said retort for introducing the material to be treated, means for venting said retort, said retort being provided adjacent to its rear end with an annular row of discharge ports, closure means for said discharge ports, means for automatically opening and closing said closure means, means connected with the rear end of said retort for controlling the admission of air or other gas thereinto, an enveloping hood enclosing the discharge end of said retort, and a discharge conduit leading out of said hood.

7. In a kiln, a substantially air tight rotary retort having an annular row of discharge ports at its rear end, closure means for said discharge ports, and means for automatically opening and closing said closure means.

8. In a kiln, a substantially air tight rotary retort, a furnace housing enclosing said retort for heating the same, means communicating with the forward end of said retort for introducing the material to be treated, an adjustable vent means for venting said retort, means connected with the rear end of said retort for controlling the admission of air or other fluid thereinto, the exterior rear end of said retort having a plurality of circumferentially alined discharged ports, closure means for said discharge ports, pivoted lever devices connected with said retort for supporting said closure means, each lever device having an anti-friction roller at its free end, a fixed discontinuous circular track-way having a drop-section beneath said retort, said track-way being adapted to engage the rollers of said lever devices to hold the closure means in normal closed position, and said drop section of said track-way being adapted to permit a downward swing of said lever devices to open said closure means as the rotation of the retort positions each discharge port at the underside of said retort.

9. In a kiln, a substantially air tight rotary retort, a furnace housing enclosing said retort for heating the same, means communicating with the forward end of said retort for introducing the material to be treated, an adjustable vent means for venting said retort, means connected with the rear end of said retort for controlling the admission of air or other fluid thereinto, the exterior rear end of said retort having a plurality of circumferentially alined discharge ports, closure means for said discharge ports, pivoted lever devices connected with said retort for supporting said closure means, each lever device having an anti-friction roller at its free end, a fixed discontinuous circular track-way having a drop-section beneath said retort, said track-way being adapted to engage the rollers of said lever devices to hold the closure means in normal closed position, said drop section of said track-way being adapted to permit a downward swing of said lever devices to open said closure means as the rotation of the retort positions each discharge port at the underside of said retort, a hood enclosing the exterior rear end of said retort, and a discharge conduit leading out of the underside of said hood to receive the material discharged from said retort.

10. In a kiln, a substantially air tight rotary retort having an annular row of discharge ports at its rear end, a gate-member for closing each discharge port, a gate-lever for supporting each gate-member pivotally connected on the outer side of said retort, each gate-lever having an anti-friction roller at its free end, a fixed discontinuous circular track-way extending around and spaced outwardly from said retort adapted to engage said rollers to hold said gate-levers inwardly swung with the gate-members in closed relation to said discharge ports, said track-way having a drop-section beneath said retort adapted to permit a downward swing of each gate-lever to move each gate-member to open position as the rotation of said retort positions each discharge port at the underside of said retort.

In testimony that I claim the invention set forth above I have hereunto set my hand this 18th day of July, 1923.

ELLIS C. KENT.

Witnesses:
　GEORGE D. RICHARDS,
　ADOLPH HANSEN.